United States Patent
Lu et al.

(10) Patent No.: US 11,930,162 B2
(45) Date of Patent: Mar. 12, 2024

(54) VIDEO COMPRESSION METHOD AND SYSTEM

(71) Applicant: Nanning FuLian FuGui Precision Industrial Co., Ltd., Nanning (CN)

(72) Inventors: Qian Lu, Shenzhen (CN); Hai-Yuan He, Shenzhen (CN)

(73) Assignee: Nanning FuLian FuGui Precision Industrial Co., Ltd., Nanning (CN)

(*) Notice: Subject to any disclaimer, the term of this patent is extended or adjusted under 35 U.S.C. 154(b) by 90 days.

(21) Appl. No.: 17/683,467

(22) Filed: Mar. 1, 2022

(65) Prior Publication Data
US 2023/0217010 A1   Jul. 6, 2023

(30) Foreign Application Priority Data
Jan. 5, 2022   (CN) .......................... 202210006451.0

(51) Int. Cl.
*H04N 19/52*   (2014.01)
*H04N 19/105*   (2014.01)
*H04N 19/119*   (2014.01)
*H04N 19/139*   (2014.01)
*H04N 19/167*   (2014.01)
*H04N 19/172*   (2014.01)
*H04N 19/176*   (2014.01)
*H04N 19/182*   (2014.01)
(Continued)

(52) U.S. Cl.
CPC ......... *H04N 19/105* (2014.11); *H04N 19/119* (2014.11); *H04N 19/139* (2014.11); *H04N 19/167* (2014.11); *H04N 19/172* (2014.11); *H04N 19/176* (2014.11); *H04N 19/182* (2014.11); *H04N 19/186* (2014.11); *H04N 19/52* (2014.11); *H04N 19/597* (2014.11)

(58) Field of Classification Search
None
See application file for complete search history.

(56) References Cited

U.S. PATENT DOCUMENTS 5,644,406 A * 7/1997 Harrington ............. G06T 9/005
                                                        382/239
6,211,971 B1 * 4/2001 Specht ...................... G06T 5/50
                                                        358/1.9
(Continued)

FOREIGN PATENT DOCUMENTS

CN   110300977 A   10/2019

*Primary Examiner* — Mohammad J Rahman
(74) *Attorney, Agent, or Firm* — ScienBiziP, P.C.

(57) ABSTRACT

A system and method for video compression divides colors of all pixel points of a target video frame into R, G, and B values, and all pixels are placed in a three-dimensional coordinate system to establish a correspondence between each pixel point and the coordinate position. Fuzzy recombination and division are performed on all pixel blocks and pixel points with similar RGB values are divided into pixel blocks to obtain a first target pixel block. Pixel blocks with same RGB values but with coordinates which are not close to the first target pixel block are extracted and divided to obtain a second target pixel block. An area enveloping the second target pixel block is extracted, and vector changes of all dynamic pixel points on the enveloping line are traversed and analyzed to determine a minimum compression change block for compression process.

13 Claims, 6 Drawing Sheets

(51) Int. Cl.
 *H04N 19/186* (2014.01)
 *H04N 19/597* (2014.01)

(56) References Cited

U.S. PATENT DOCUMENTS

| | | | | |
|---|---|---|---|---|
| 6,356,588 | B1* | 3/2002 | Otto | G06T 9/005 375/240.03 |
| 2002/0104891 | A1* | 8/2002 | Otto | G06Q 20/346 235/494 |
| 2005/0157926 | A1 | 7/2005 | Moravec et al. | |
| 2006/0013479 | A1* | 1/2006 | Trimeche | H04N 23/84 382/167 |
| 2009/0324063 | A1* | 12/2009 | Murase | H04N 1/624 382/163 |
| 2011/0082764 | A1* | 4/2011 | Flusser | G06Q 30/0631 705/26.7 |
| 2012/0257677 | A1 | 10/2012 | Bankoski et al. | |
| 2015/0109186 | A1* | 4/2015 | Layson, Jr. | G02B 27/017 345/8 |
| 2015/0317929 | A1* | 11/2015 | You | G09G 3/006 345/589 |
| 2016/0154239 | A9* | 6/2016 | Layson, Jr. | G02B 27/017 345/8 |
| 2016/0260306 | A1* | 9/2016 | Jäckel | G06N 7/02 |
| 2018/0330522 | A1 | 11/2018 | Pedersen et al. | |
| 2019/0208119 | A1* | 7/2019 | Ekstrand | G06T 5/002 |
| 2020/0226391 | A1* | 7/2020 | Gu | G06F 17/18 |
| 2020/0349722 | A1 | 11/2020 | Schmid et al. | |
| 2022/0121884 | A1* | 4/2022 | Zadeh | G06V 10/764 |
| 2022/0191996 | A1* | 6/2022 | Huang | H05B 45/14 |

* cited by examiner

VIDEO COMPRESSION METHOD AND SYSTEM

CROSS-REFERENCE TO RELATED APPLICATIONS

This application claims priority to Chinese Patent Application No. 202210006451.0 filed on Jan. 5, 2022, in China State Intellectual Property Administration, the contents of which are incorporated by reference herein.

FIELD

The subject matter herein generally relates to video compression technology, in particular to a video compression method and system.

BACKGROUND

The current mainstream video compression technology uses block division coding technology to divide an image into multiple rectangular blocks, decodes the image in block units, and then divides each sub-block into smaller units through recursive division, so that each part is predicted using different modes, and then transformed. Such data is then quantized and entropy encoded to form compressed data. In the prior art, due to the large number of block divisions, the amount of calculation is large and the compression efficiency is low.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 1:
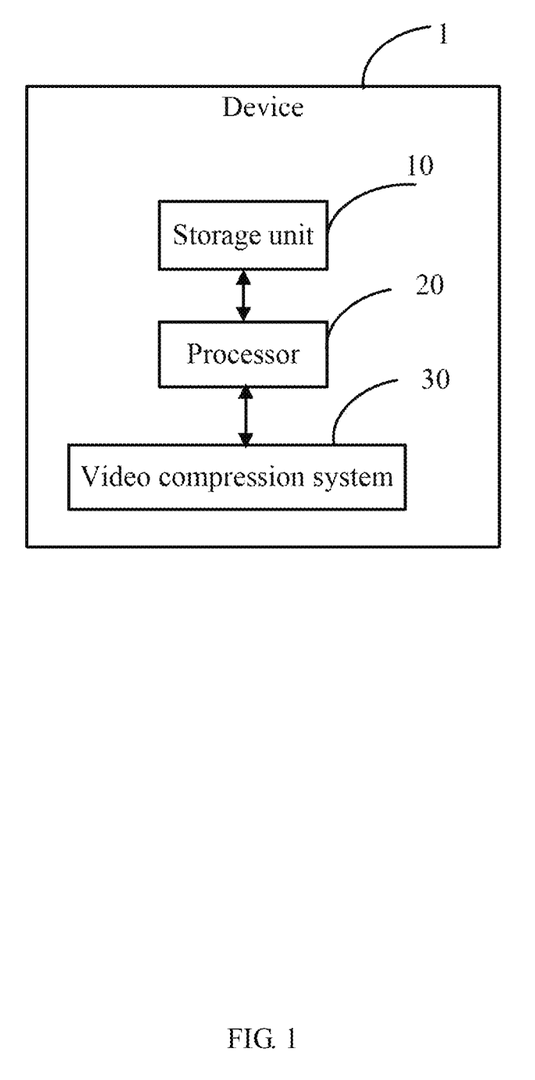
FIG. 1 is a block diagram of a device according to one embodiment of the present disclosure.

FIG. 1 is a block diagram of an exemplary embodiment of functional modules of a device 1 for compressing video data. The device 1 includes a video compression system 10, a storage unit 20, and a processor 30.

The storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and other components. The processor 30 may be a central processing unit (CPU), a controller, a microcontroller, a microprocessor, or other data processing chip.

Figure 2:
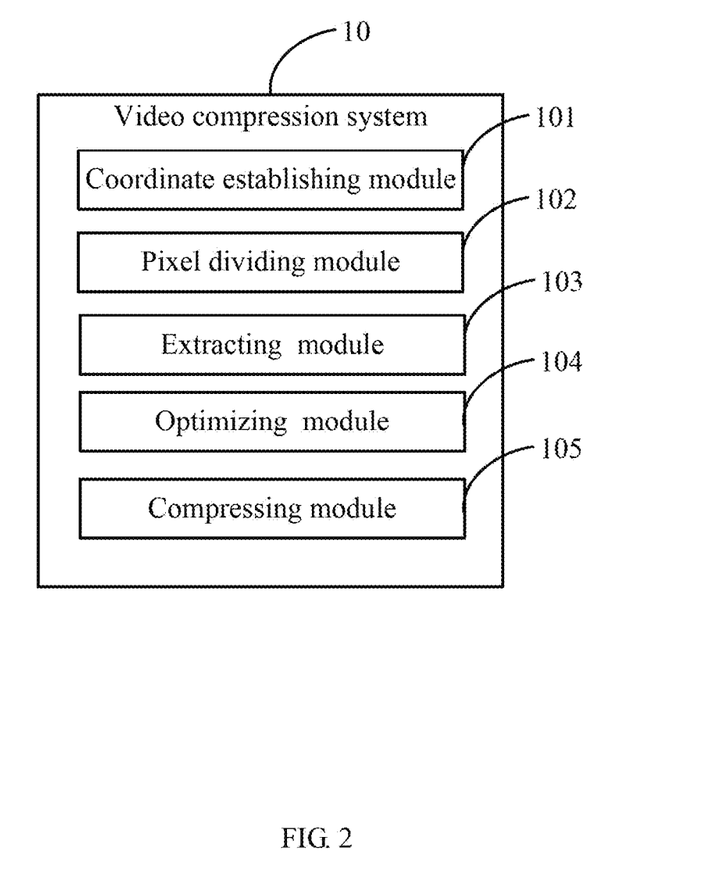
FIG. 2 is a block diagram of one embodiment of a video compression system of the device of FIG. 1 according to the present disclosure.

FIG. 2 illustrates an exemplary embodiment of functional modules of the video compression system 10.

The video compression system 10 includes a coordinate establishing module 101, a pixel dividing module 102, an extracting module 103, an optimizing module 104, and a compressing module 105. The modules are configured to be executed by one or more processors (in the embodiment, one processor 30). The modules referred to are computer program segments that perform specific instructions. The storage unit 20 is used to store program code and other data of the video compression system 10. The processor 30 is used to execute the program code stored in the storage unit 20.

The coordinate establishing module 101 divides colors of all pixel points of a target video frame into R, G, and B, and places all pixels in the three-dimensional coordinate system to establish a relationship between each pixel point and a coordinate position.

Figure 3:
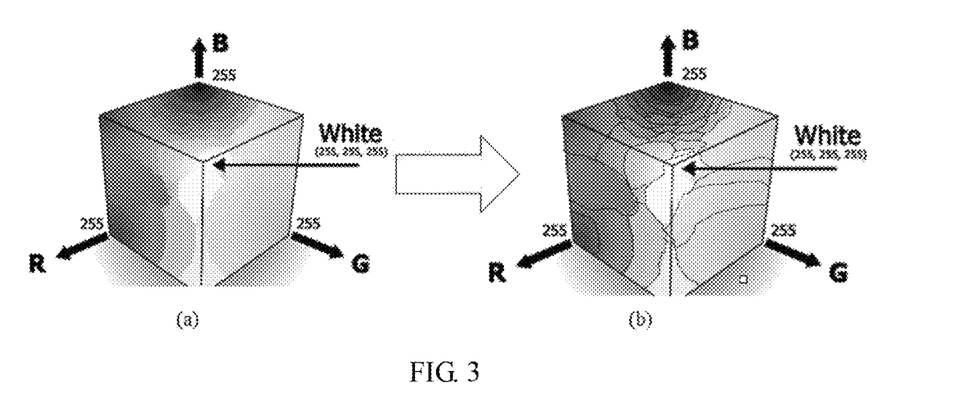
FIG. 3 is a schematic diagram of three-dimensional coordinates before and after fuzzy recombination and division of all pixel blocks of a target video frame.

As shown in FIG. 3, an RGB three-dimensional standard map is the relationship between each pixel point and a coordinate position.

The pixel dividing module 102 performs fuzzy recombination and division on all pixel blocks of the target video frame according to distribution of each pixel point.

As shown in FIG. 3, according to pixel distribution not easily distinguishable by human eyes, all pixel blocks of the target video frame are subjected to fuzzy reorganization and division to obtain RGB standard image reorganization and division (as shown in (b) in FIG. 3), wherein, (a) of FIG. 3 is a three-dimensional standard image of RGB before pixel block reorganization and division. In the embodiment, all pixel blocks of the target video frame are fuzzy recombined and divided into different colors. In the embodiment, the fuzzy recombination and block division of colors are performed by using pixel points that are difficult for human eyes to distinguish, which reduces the number of block divisions and thus reduces the amount of calculation.

The pixel dividing module 102 further divides pixel points with similar RGB values into pixel blocks according to a first preset rule to obtain a first target pixel block.

Specifically, the first target pixel block $Z\{A1, A2, A3 \ldots An\}$ is defined; when $An(Rn, Gn, Bn)$ satisfies $Rn+1-Rn<=M$, $Gn+1-Gn<=M$, $Bn+1-Bn<=M$, $\{An\}$ is defined as the first target pixel block Z, wherein M is a predefined real number greater than zero.

Figure 4:
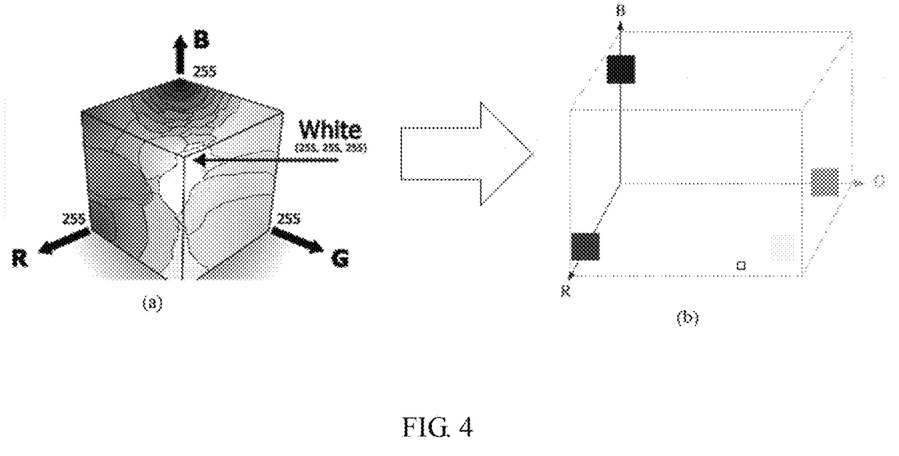
FIG. 4 is a schematic diagram of the division of pixels with adjacent RGB values into pixel blocks according to a first preset rule to obtain a first target pixel block.

In the embodiment, a point with adjacent RGB values is found as the first target pixel block (that is, the pixel points with a same color constitute the first target pixel block), for example, a green pixel block composed of green, a red pixel block composed of red, etc.. The green and red colors herein are for illustration only, the colors are not limited, and other colors may be used. The pixel dividing module 102 performs fuzzy reorganization and division on all the pixel blocks of the target video frame, and after dividing the pixel blocks into different colors, further divides the pixel points of a video frame according to the colors based on the values of the pixel points. Pixel points whose value difference is less than a preset value M (for example, 10) are regarded as pixel points of the same color, so that the pixel points of the same color are divided into the same pixel block. As shown in FIG. 4, for example, a current frame has only 4 colors, which is divided into four pixel blocks in FIG. 4(*b*). FIG. 4(*a*) shows the reorganization and division diagram of an RGB standard image obtained after pixel block reorganization and division.

The pixel dividing module 102 further extracts pixel blocks with a same RGB value but with coordinates which are not in close proximity in the first target pixel block, and divides the pixel blocks with the same RGB value but with coordinates which are not in close proximity according to a second preset rule to obtain a second target pixel block.

Specifically, the pixel points A whose coordinate is $(Xn, Yn)$ in the first target pixel block are taken, when $|Xn\pm1-Xn|<=1$ and $|Yn\pm1-Yn|=<1$ are satisfied. The coordinate $(Xn, Yn)$ of pixel point A and the physical coordinate of the pixel point $(Xn\pm1; Yn\pm1)$ are adjacent to each other, and then the pixel point $(Xn\pm1; Yn\pm1)$ and the pixel point A are divided into one block, all pixel points are divided into N parts or blocks according to the rule, and the divided second target pixel block is obtained.

Figure 5:
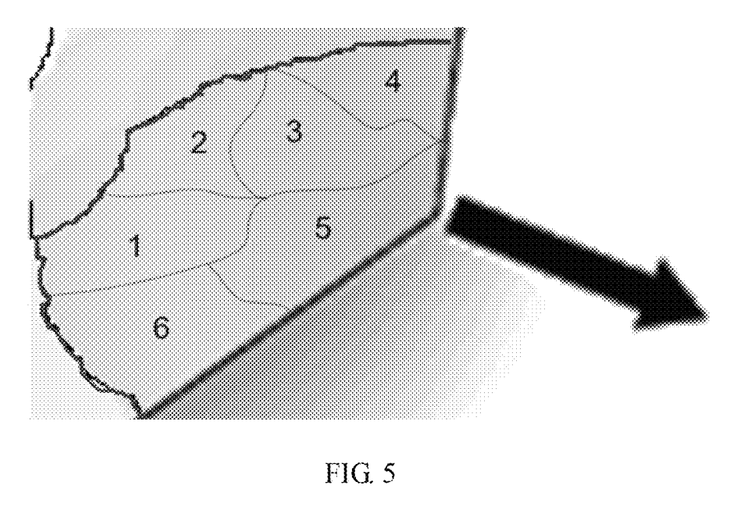
FIG. 5 is a schematic diagram of the division of pixel blocks with a same RGB value but different coordinates after recombination into N=6 equal parts according to a second preset rule.

In the embodiment, pixel points of the same color in the video frame may be scattered over multiple places. Therefore, it is necessary to further divide the reorganized pixel blocks into pixel blocks according to the scattered areas. In the embodiment, pixel blocks of the same color are divided into N parts by using points with X, Y axis coordinates which are in close proximity as a block division standard. As shown in FIG. 5, the pixel block Z with the same RGB value after recombination but with coordinates which are not in close proximity is divided into 6 equal parts.

The extracting module 103 is used to extract an enveloping area of the second target pixel block, and traverse and analyze vector changes of all dynamic pixel points on an enveloping line of the enveloping area.

Figure 6:
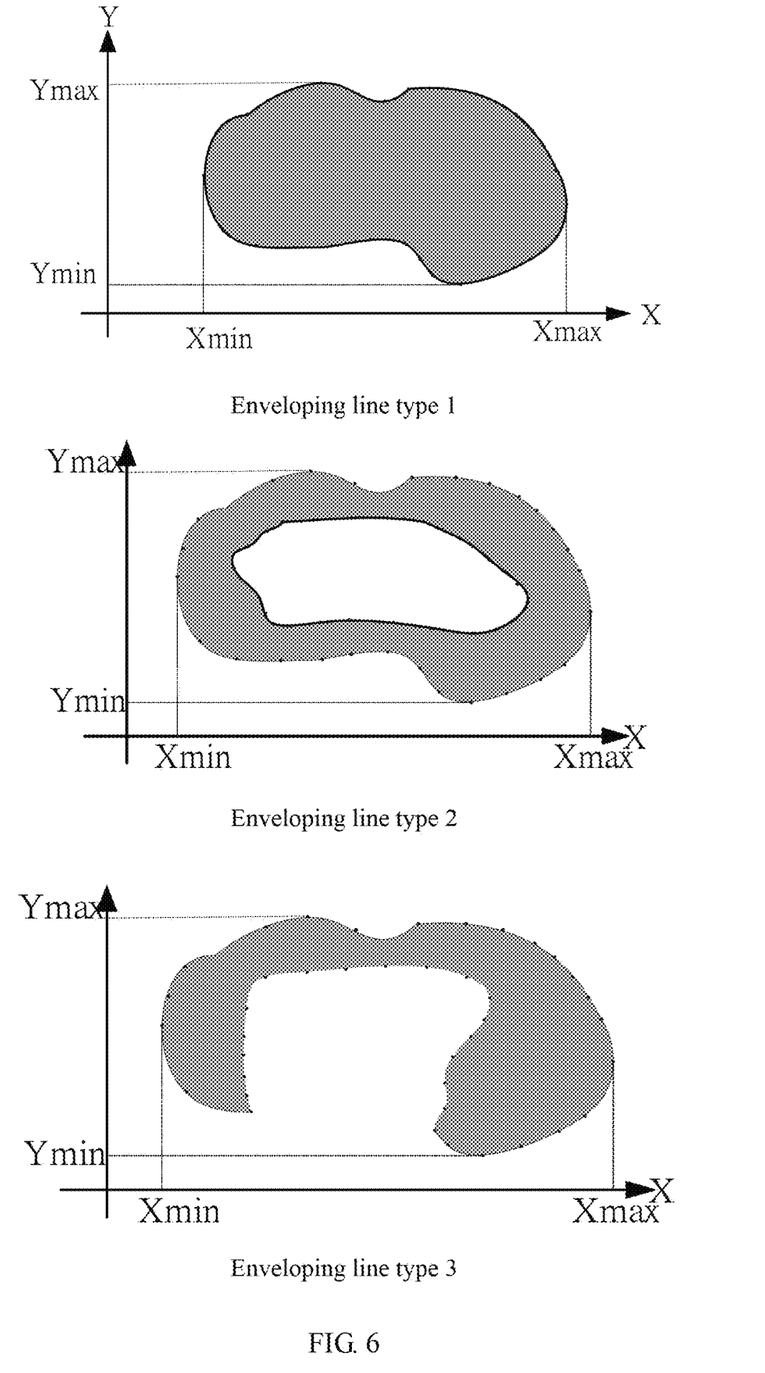
FIG. 6 is a schematic diagram of three types of enveloping lines of pixel blocks.

Wherein, the dynamic pixel points are pixels in a dynamic state. As shown in FIG. 6, a pixel block composed of adjacent points with the same RGB value and X, Y axis coordinates may have three types of enveloping lines.

The optimizing module 104 is used for splitting the enveloping area and optimizing a dynamic block according to the vector changes of the dynamic pixel points.

Specifically, when the RGB value of the pixel points of the enveloping line changes, the pixel points are considered to be in the dynamic state. When the RGB value of the pixel points does not change, the pixel points are discarded and further searching done, and so on, the enveloping line of the changing pixel points is gradually reduced to find a minimum pixel dynamic block.

Figure 7:
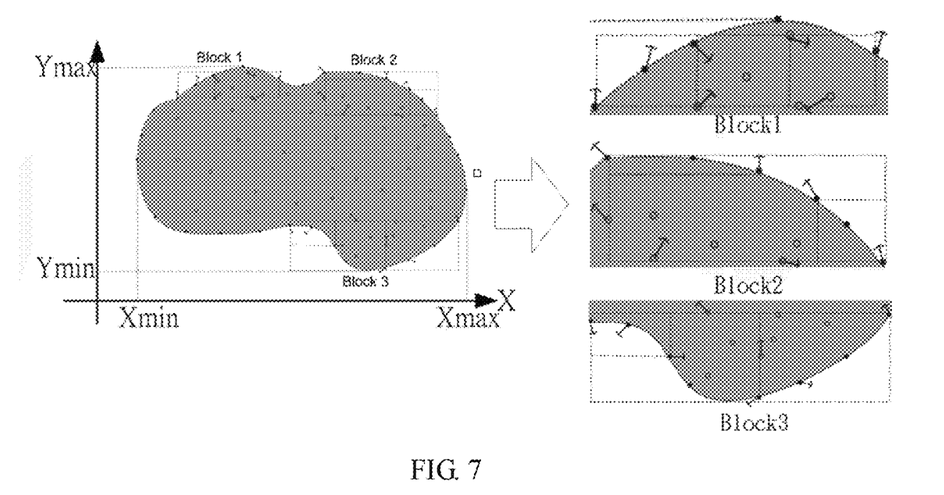
FIG. 7 is a schematic diagram of a vector dynamic status of pixel points on an enveloping line.

As shown in FIG. 7, the pixel points within the enveloping line of the enveloping area are of the same color, and even if the pixel points move, a change in color will not be caused. Therefore, no compression is required. Therefore, it is only necessary to reduce the pixel block to the area where the pixels on the enveloping line are located, such as a rectangular area where Block1, Block2, and Block3 are located. The dynamism of the pixel points on the enveloping line is analyzed. If the pixel points move outside the enveloping area, the color of the pixel points may change. If the pixel points move inside the enveloping area, the color of the pixel points will not be changed. Therefore, the rectangular area where Block1, Block2, and Block3 are located can be further divided to reduce the enveloping line of a pixel change point.

In the embodiment, by optimizing the dynamic pixel points on the enveloping line of the pixel block, the range of the region to be compressed is further narrowed, and the compression efficiency is improved.

The splitting of the enveloping area and optimizing a dynamic block according to the vector changes of the dynamic pixel points further includes: determining whether the pixel block in the enveloping line is the minimum pixel dynamic block; if the pixel block in the enveloping line is the minimum pixel dynamic block, recording RGB value changes caused by a movement of pixels on the enveloping line to adjacent pixels to predict a movement trajectory of the dynamic pixel points on the enveloping line; calculating a vector relationship between a frame rate and the dynamic pixel points according to a preset formula, and determining the minimum compression change block in combination with the predicted movement trajectory of the dynamic pixel points on the enveloping line.

Figure 8:
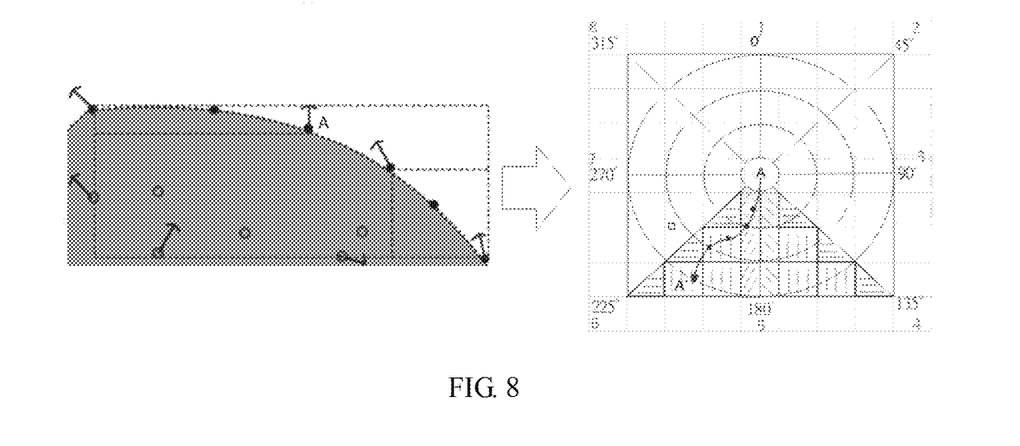
FIG. 8 is a schematic diagram of vector dynamic variation around 360° of a pixel prediction point A on an enveloping line.

The following is a prediction of a movement trajectory of a single pixel:

As shown in FIG. 8, with A as a center point, a vector dynamic change of the predicted pixel point A around 360° is established on the enveloping line in a manner similar to radar scanning. The area surrounding the pixel point A is divided into 8 equal parts; then the RGB values of the 9 pixel points included in each equal part are recorded and compared and the RGB value changes caused by the movement of the pixel point A to the coordinates of the 9 pixel points are also compared. A dynamic change of the pixel point A is predicted, wherein the pixel point A is any pixel point on the enveloping line. The circles in FIG. 8 indicate the position A' that the pixel point A may reach by moving around. Wherein, the pixel point A is any pixel point on the enveloping line.

For point A, the preset formula is: $QA=XA/X0=(VA*T0)/X0$ (formula (1));

wherein, T0 is a frame-to-frame change time; VA is a dynamic change speed of the pixel point A; the distance between adjacent pixels is X0; T0 is a possible distance moved by the pixel point A within the frame-to-frame change time T0; QA is a possible number of pixels passing by the pixel point A during the movement of the pixel point A within the frame-to-frame change time T0.

For example, when predicting that A moves to the 180°~225° area, the RGB value of the area which A passes through will change. According to the trend of the change, the change trajectory of the dynamic pixel points of A as shown in the A-A' trajectory line is predicted.

In the embodiment, by using the radar scanning method and monitoring the change of the RGB value of the surrounding pixel points caused by the change of the pixel point vector, the movement trajectory of the dynamic pixel points can be predicted by a relatively simple method.

The compressing module 105 is for determining a minimum compression change block according to the optimized dynamic change block, and compressing the minimum compression change block.

After finding the minimum pixel dynamic block of all the pixels on the enveloping line, all the minimum pixel dynamic blocks are superimposed to obtain the minimum compression change block. Compression of only the minimum compression change block is needed to complete the video compression, thereby reducing the amount of compression.

In the embodiment, the enveloping line of the pixel block is extracted by fuzzy reorganization and division of pixel block of the image, and a technical method similar to radar scanning is used to analyze the vector change area of the online dynamic pixel points in the enveloping line of the pixel block. The relationship between the pixel point vector change and the frame rate change in this area are combined to find and determine the best image pixel block to be compressed, which removes data redundancy in the image, thereby improving the coding efficiency of video compression.

Figure 9:
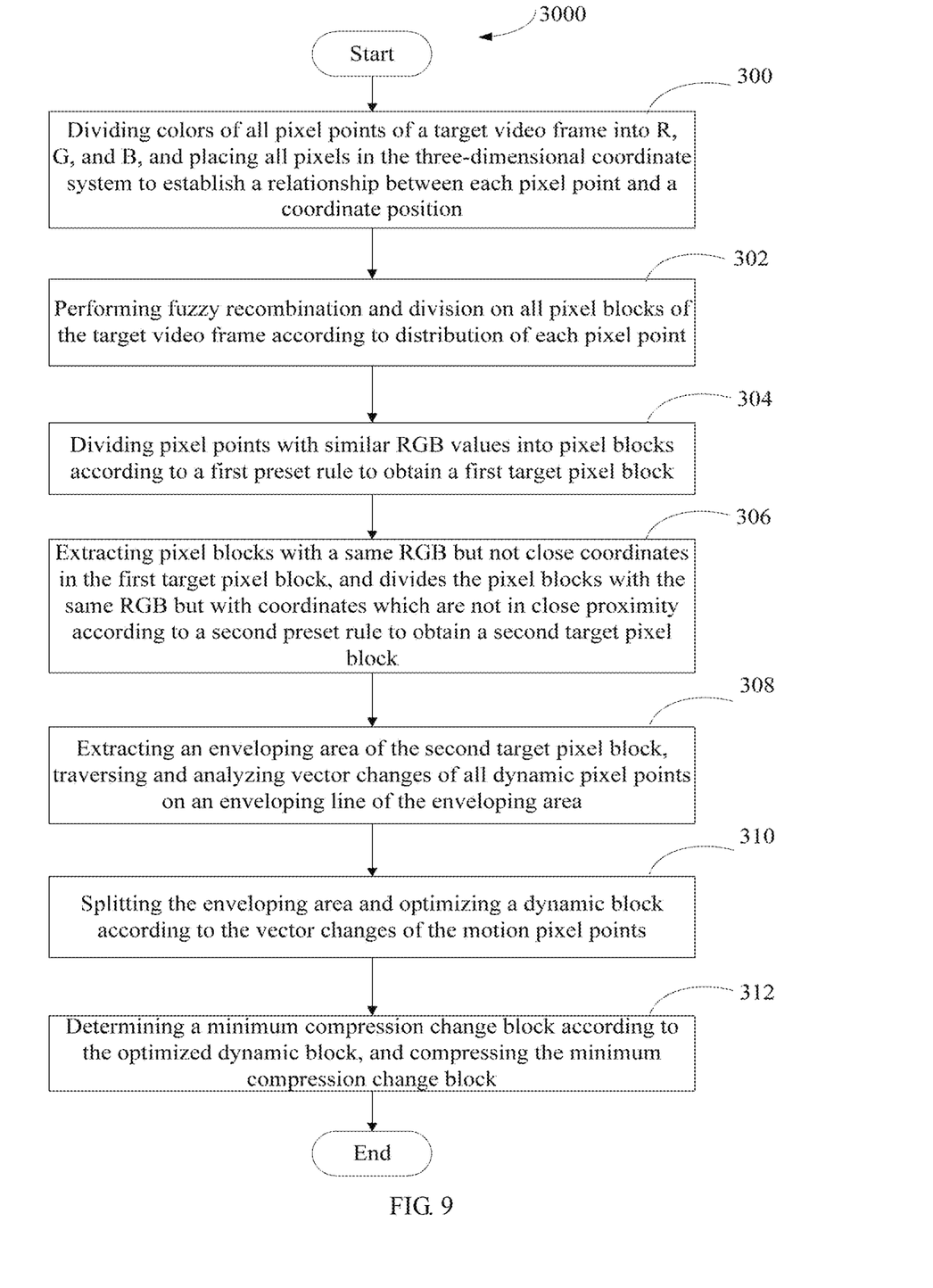
FIG. 9 is a flowchart of a video compression method according to one embodiment of the present disclosure.

FIG. 3 illustrates a flowchart presented in accordance with an embodiment of a video compression method 3000. The method 3000 is applied in device 1, and the function modules 101-105, as FIG. 2 illustrates, are executed by the processor 30. Each block shown in FIG. 3 represents one or more processes, methods, or subroutines, carried out in the exemplary method 3000. Additionally, the illustrated order of blocks is by example only and the order of the blocks can be changed. The method 3000 can begin at block 300.

At block 300, dividing colors of all pixel points of a target video frame into R, G, and B, and placing all pixels in the three-dimensional coordinate system to establish a relationship between each pixel point and a coordinate position.

As shown in FIG. 3, an RGB three-dimensional standard map is a relationship between each pixel point and the coordinate position.

At block 302, performing fuzzy recombination and division on all pixel blocks of the target video frame according to distribution of each pixel point.

As shown in FIG. 3, according to pixel distribution not easily distinguishable by human eyes, all pixel blocks of the target video frame are subjected to fuzzy reorganization and division to obtain RGB standard image reorganization and division (as shown in (b) in FIG. 3), wherein, (a) of FIG. 3 is a three-dimensional standard image of RGB before pixel block reorganization and division. In the embodiment, all pixel blocks of the target video frame are fuzzy recombined and divided into different colors. In the embodiment, the fuzzy recombination and block division of colors are performed by using pixel points that are difficult for human eyes to distinguish, which reduces the number of block divisions and thus reduces the amount of calculation.

At block 304, dividing pixel points with adjacent RGB values into pixel blocks according to a first preset rule to obtain a first target pixel block.

Specifically, the first target pixel block $Z\{A1, A2, A3 \ldots An\}$ is defined; when $An(Rn, Gn, Bn)$ satisfies $Rn+1-Rn<=M$, $Gn+1-Gn<=M$, $Bn+1-Bn<=M$, $\{An\}$ is defined as the first target pixel block Z, wherein M is a predefined real number greater than zero.

In the embodiment, a point with adjacent RGB values is found as the first target pixel block (that is, the pixel points with a same color constitute the first target pixel block), for example, a green pixel block composed of green, a red pixel block composed of red, etc.. The green and red colors herein are for illustration only, and the colors are not limited, and other colors may be used. Fuzzy reorganization and division are performed on all the pixel blocks of the target video frame, and after dividing the pixel blocks into different colors, further the pixel points of a video frame are divided according to the colors based on the values of the pixel points. Pixel points whose value difference are less than a preset value M (for example, 10) are regarded as pixel points of the same color, so that the pixel points of the same color are divided into the same pixel block. As shown in FIG. 4, for example, a current frame has only 4 colors, which is divided into four pixel blocks in FIG. 4(b). FIG. 4(a) shows the reorganization and division diagram of an RGB standard image obtained after pixel block reorganization and division.

At block 306, extracting pixel blocks with a same RGB value but with coordinates which are not in close proximity in the first target pixel block, and divides the pixel blocks with the same RGB value but with coordinates which are not in close proximity according to a second preset rule to obtain a second target pixel block.

Specifically, the pixel points A whose coordinate is $(Xn, Yn)$ in the first target pixel block are taken, when $|Xn\pm1-Xn|<=1$ and $|Yn\pm1-Yn|=<1$ are satisfied. The coordinate $(Xn, Yn)$ of pixel point A and the physical coordinate of the pixel point $(Xn\pm1; Yn\pm1)$ are adjacent to each other, and then the pixel point $(Xn\pm1; Yn\pm1)$ and the pixel point A are divided into one block, all pixel points are divided into N parts or blocks according to the rule, and the divided second target pixel block is obtained.

In the embodiment, pixel points of the same color in the video frame may be scattered over multiple places. Therefore, it is necessary to further divide the reorganized pixel blocks into pixel blocks according to the scattered areas. In the embodiment, pixel blocks of the same color are divided into N parts by using points with adjacent X, Y axis coordinates as a block division standard. As shown in FIG. 5, the pixel block Z with the same RGB value after recombination but with coordinates which are not in close proximity is divided into 6 equal parts.

At block 308, extracting an enveloping area of the second target pixel block, traversing and analyzing vector changes of all dynamic pixel points on an enveloping line of the enveloping area.

Wherein, the dynamic pixel points are pixels in a dynamic state. As shown in FIG. 6, a pixel block composed of adjacent points with the same RGB value and X, Y axis coordinates may have three types of enveloping lines.

At block 310, splitting the enveloping area and optimizing a dynamic block according to the vector changes of the dynamic pixel points.

Specifically, when the RGB value of the pixel points of the enveloping line changes, the pixel points are considered to be in the dynamic state. When the RGB value of the pixel points does not change, the pixel points are discarded and further searched done, and so on, the enveloping line of the changing pixel points is gradually reduced to find a minimum pixel dynamic block.

As shown in FIG. 7, the pixel points within the enveloping line of the enveloping area are of the same color, and even if the pixel points move, a change in color will not be caused. Therefore, no compression is required. Therefore, it is only necessary to reduce the pixel block to the area where the pixels on the enveloping line are located, such as a rectangular area where Block1, Block2, and Block3 are located. The dynamic state of the pixel points on the enveloping line is analyzed. If the pixel points move outside the enveloping area, the color of the pixel points may change. If the pixel points move inside the enveloping area, the color of the pixel points will not be changed. Therefore, the rectangular area where Block1, Block2, and Block3 are located can be further divided to reduce the enveloping line of a pixel change point.

In the embodiment, by optimizing the dynamic pixel points on the enveloping line of the pixel block, the range of the region to be compressed is further narrowed, and the compression efficiency is improved.

The splitting the enveloping area and optimizing a dynamic block according to the vector changes of the dynamic pixel points further includes: determining whether the pixel block in the enveloping line is the minimum pixel dynamic block; if the pixel block in the enveloping line is the minimum pixel dynamic block, recording RGB value changes caused by a movement of pixels on the enveloping line to adjacent pixels to predict a movement trajectory of the dynamic pixel points on the enveloping line; calculating a vector relationship between a frame rate and the dynamic pixel points according to a preset formula, and determining the minimum compression change block in combination with the predicted movement trajectory of the dynamic pixel points on the enveloping line.

The following is a prediction of a movement trajectory of a single pixel:

As shown in FIG. 8, with A as a center point, a vector dynamic change of the predicted pixel point A around 360° is established on the enveloping line in a manner similar to radar scanning. The area surrounding the pixel point A is divided into 8 equal parts; then the RGB values of the 9 pixel points included in each equal part are recorded and compared and the RGB value changes caused by the movement of the pixel point A to the coordinates of the 9 pixel points are also compared. A dynamic change of the pixel point A is predicted, wherein the pixel point A is any pixel point on the enveloping line. The circles in FIG. 8 indicate the position A' that the pixel point A may reach by moving around. Wherein, the pixel point A is any pixel point on the enveloping line.

For point A, the preset formula is: $QA=XA/X0=(VA*T0)/X0$ (formula (1));

wherein, T0 is a frame-to-frame change time; VA is a dynamic change speed of the pixel point A; the distance between adjacent pixels is X0; T0 is a possible distance moved by the pixel point A within the frame-to-frame change time T0; QA is a possible number of pixels passing by the pixel point A during the movement of the pixel point A within the frame-to-frame change time T0.

For example, when predicting that A moves to the 180°~225° area, the RGB value of the area that A is passing through will change. According to the trend of the change, the change trajectory of the dynamic pixel points of A as shown in the A-A' trajectory line is predicted.

In the embodiment, by using the radar scanning method and monitoring the change of the RGB value of the surrounding pixel points caused by the change of the pixel point vector, the movement trajectory of the dynamic pixel points can be predicted by a relatively simple method.

At block 312, determining a minimum compression change block according to the optimized dynamic block, and compressing the minimum compression change block.

After finding the minimum pixel dynamic block of all the pixels on the enveloping line, all the minimum pixel dynamic blocks are superimposed to obtain the minimum compression change block. Compression of only the minimum compression change block is needed to complete the video compression, thereby reducing the amount of compression.

In the embodiment, the enveloping line of the pixel block is extracted by fuzzy reorganization and division of pixel block of the image, and a technical method similar to radar scanning is used to analyze the vector change area of the online dynamic pixel points in the enveloping line of the pixel block. The relationship between the pixel point vector change and the frame rate change in this area are combined to find and determine the best image pixel block to be compressed, which removes data redundancy in the image, thereby improving the coding efficiency of video compression.

The embodiments shown and described above are only examples. Many details are often found in the art such as the other features of method for video compression by data processing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A video compression method, the method comprising:
   dividing colors of all pixel points of a target video frame into R, G, and B, and placing all pixel points in a three-dimensional coordinate system to establish a corresponding relationship between each pixel point and a coordinate position;
   performing fuzzy recombination and division on all pixel blocks of the target video frame according to distribution of each pixel point;
   dividing pixel points with similar RGB values into pixel blocks according to a first preset rule to obtain a first target pixel block;
   extracting pixel blocks with a same RGB value but with coordinates which are not in close proximity in the first target pixel block, and dividing the pixel blocks with the same RGB value but with coordinates which are not in close proximity according to a second preset rule to obtain a second target pixel block;

extracting an enveloping area of the second target pixel block, traversing and analyzing vector changes of all dynamic pixel points on an enveloping line of the enveloping area, wherein the dynamic pixel points are pixels in a dynamic state;

splitting the enveloping area and optimizing an dynamic block according to the vector changes of the dynamic pixel points;

determining a minimum compression change block according to the optimized dynamic block, and compressing the minimum compression change block;

wherein, the dividing pixel points with similar RGB values into pixel blocks according to a first preset rule to obtain a first target pixel block comprises:

defining the first target pixel block $Z\{A1, A2, A3 \ldots An\}$;

when $An(Rn, Gn, Bn)$ satisfies $Rn+1-Rn<=M$, $Gn+1-Gn<=M$, $Bn+1-Bn<=M$, defining $\{An\}$ as the first target pixel block Z, wherein M is a predefined real number greater than zero.

2. The video compression method according to claim 1, the extracting pixel blocks with a same RGB value but not with coordinates which are not in close proximity in the first target pixel block, and dividing the pixel blocks with the same RGB value but with coordinates which are not in close proximity according to a second preset rule to obtain a second target pixel block comprises:

taking the pixel points A whose coordinate is $(Xn, Yn)$ in the first target pixel block, when satisfying $|Xn\pm1-Xn|<=1$ and $|Yn\pm1-Yn|=<1$, the coordinate $(Xn, Yn)$ of pixel point A and the physical coordinate of the pixel point $(Xn\pm1; Yn\pm1)$ are adjacent to each other, then dividing the pixel point $(Xn\pm1; Yn\pm1)$ and the pixel point A into one piece, dividing all pixel points into N parts according to the rule, and obtaining the divided second target pixel block.

3. The video compression method according to claim 1, the splitting the enveloping area and optimizing a dynamic block according to the vector changes of the dynamic pixel points comprises:

when the RGB value of the pixel points of the enveloping line changes, the pixel points are considered to be in the dynamic state; when the RGB value of the pixel points does not change, the pixel points are discarded and searched further, and so on, the enveloping line of the changing pixel points is gradually reduced to find a minimum pixel dynamic block.

4. The video compression method according to claim 3, the splitting the enveloping area and optimizing a dynamic block according to the vector changes of the dynamic pixel points further comprises:

determining whether the pixel block in the enveloping line is the minimum pixel dynamic block;

recording RGB value changes caused by a movement of pixels on the enveloping line to adjacent pixels to predict a movement trajectory of the dynamic pixel points on the enveloping line when the pixel block in the enveloping line is the minimum pixel dynamic block,;

calculating a vector relationship between a frame rate and the dynamic pixels according to a preset formula, and determining the minimum compression change block in combination with the predicted movement trajectory of the dynamic pixel points on the enveloping line.

5. The video compression method according to claim 4, the recording RGB value changes caused by a movement of pixels on the enveloping line to adjacent pixels to predict a movement trajectory of the dynamic pixel points on the enveloping line comprises:

dividing an area surrounding the pixel point A into 8 equal parts;

recording and comparing the RGB values of the 9 pixel points included in each equal part and comparing the RGB value changes caused by the movement of the pixel point A to the coordinates of the 9 pixel points;

predicting a dynamic change of the pixel point A, wherein the pixel point A is any pixel point on the enveloping line.

6. The video compression method according to claim 4, the preset formula is:

$$QA=XA/X0=(VA*T0)/X0;$$

wherein, T0 is a frame-to-frame change time; VA is a dynamic change speed of the pixel point A; the distance between adjacent pixels is X0; T0 is a possible distance moved by the pixel point A within the frame-to-frame change time T0; QA is a possible number of pixels passed by the pixel point A during the movement of the pixel point A within the frame-to-frame change time T0.

7. A video compression system, the video compression system comprising:

at least one processor;

a storage unit; and one or more programs that are stored in the storage unit and executed by the at least one processor, the one or more programs comprising instructions for:

dividing colors of all pixel points of a target video frame into R, G, and B, and placing all pixels in a three-dimensional coordinate system to establish a corresponding relationship between each pixel point and a coordinate position;

performing fuzzy recombination and division on all pixel blocks of the target video frame according to distribution of each pixel point;

dividing pixel points with similar RGB values into pixel blocks according to a first preset rule to obtain a first target pixel block;

extracting pixel blocks with a same RGB value but not with coordinates which are not in close proximity in the first target pixel block, and dividing the pixel blocks with the same RGB value but with coordinates which are not in close proximity according to a second preset rule to obtain a second target pixel block;

extracting an enveloping area of the second target pixel block, traversing and analyzing vector changes of all dynamic pixel points on an enveloping line of the enveloping area, wherein the dynamic pixel points are pixels in a dynamic state;

splitting the enveloping area and optimizing an dynamic block according to the vector changes of the dynamic pixel points;

determining a minimum compression change block according to the optimized dynamic block, and compressing the minimum compression change block;

wherein the dividing pixel points with similar RGB values into pixel blocks according to a first preset rule to obtain a first target pixel block comprises:

defining the first target pixel block Z{A1, A2, A3 ... An};
when An(Rn, Gn, Bn) satisfies Rn+1−Rn<=M, Gn+1−Gn<=M, Bn+1−Bn<=M, defining {An} as the first target pixel block Z, wherein M is a predefined real number greater than zero.

8. The video compression system according to claim 7, wherein the extracting pixel blocks with a same RGB value but not with coordinates which are not in close proximity in the first target pixel block, and dividing the pixel blocks with the same RGB value but with coordinates which are not in close proximity according to a second preset rule to obtain a second target pixel block comprises:
taking the pixel points A whose coordinate is (Xn, Yn) in the first target pixel block, when satisfying |Xn±1−Xn|<=1 and |Yn±1−Yn|=<1, the coordinate (Xn, Yn) of pixel point A and the physical coordinate of the pixel point (Xn±1; Yn±1) are adjacent to each other, then dividing the pixel point (Xn±1; Yn±1) and the pixel point A into one piece, dividing all pixel points into N parts according to the rule, and obtaining the divided second target pixel block.

9. The video compression system according to claim 7, wherein the splitting the enveloping area and optimizing a dynamic block according to the vector changes of the dynamic pixel points comprises:
when the RGB value of the pixel points of the enveloping line changes, the pixel points are considered to be in the dynamic state; when the RGB value of the pixel points does not change, the pixel points are discarded and searched further, and so on, the enveloping line of the changing pixel points is gradually reduced to find a minimum pixel dynamic block.

10. The video compression system according to claim 9, wherein the splitting the enveloping area and optimizing a dynamic block according to the vector changes of the dynamic pixel points further comprises:
determining whether the pixel block in the enveloping line is the minimum pixel dynamic block;
recording RGB value changes caused by a movement of pixels on the enveloping line to adjacent pixels to predict a movement trajectory of the dynamic pixel points on the enveloping line when the pixel block in the enveloping line is the minimum pixel dynamic block;
calculating a vector relationship between a frame rate and the motion pixels according to a preset formula, and determining the minimum compression change block in combination with the predicted movement trajectory of the dynamic pixel points on the enveloping line.

11. The video compression system according to claim 10, wherein the recording RGB value changes caused by a movement of pixels on the enveloping line to adjacent pixels to predict a movement trajectory of the dynamic pixel points on the enveloping line comprises:
dividing an area surrounding the pixel point A into 8 equal parts; recording and comparing the RGB values of the 9 pixel points included in each equal part and comparing the RGB value changes caused by the movement of the pixel point A to the coordinates of the 9 pixel points, predicting a dynamic change of the pixel point A, wherein the pixel point A is any pixel point on the enveloping line.

12. The video compression system according to claim 10, the preset formula is:

$$QA=XA/X0=(VA*T0)/X0;$$

wherein, T0 is a frame-to-frame change time; VA is a dynamic change speed of the pixel point A; the distance between adjacent pixels is X0; T0 is a possible distance moved by the pixel point A within the frame-to-frame change time T0; QA is a possible number of pixels passed by the pixel point A during the movement of the pixel point A within the frame-to-frame change time T0.

13. A non-transitory computer-readable storage medium in which computer programs are stored, and the computer programs can be executed by at least one processor, to enforce following steps:
dividing colors of all pixel points of a target video frame into R, G, and B, and placing all pixels in the three-dimensional coordinate system to establish a corresponding relationship between each pixel point and a coordinate position;
performing fuzzy recombination and division on all pixel blocks of the target video frame according to distribution of each pixel point;
dividing pixel points with similar RGB values into pixel blocks according to a first preset rule to obtain a first target pixel block;
extracting pixel blocks with a same RGB value but with coordinates which are not in close proximity in the first target pixel block, and dividing the pixel blocks with the same RGB value but with coordinates which are not in close proximity according to a second preset rule to obtain a second target pixel block;
extracting an enveloping area of the second target pixel block, traversing and analyzing vector changes of all dynamic pixel points on an enveloping line of the enveloping area, wherein the dynamic pixel points are pixels in a dynamic state;
splitting the enveloping area and optimizing an motion block according to the vector changes of the dynamic pixel points;
determining a minimum compression change block according to the optimized dynamic block, and compressing the minimum compression change block;
wherein, the dividing pixel points with similar RGB values into pixel blocks according to a first preset rule to obtain a first target pixel block comprises:
defining the first target pixel block Z{A1, A2, A3 ... An};
when An(Rn, Gn, Bn) satisfies Rn+1−Rn<=M, Gn+1−Gn<=M, Bn+1−Bn<=M, defining {An} as the first target pixel block Z, wherein M is a predefined real number greater than zero.

* * * * *